United States Patent
Lu et al.

(10) Patent No.: US 10,737,458 B2
(45) Date of Patent: Aug. 11, 2020

(54) COMPOSITE MATERIAL COMPOSITION AND A METHOD OF FORMING A COMPOSITE MATERIAL COMPOSITION

(71) Applicant: City University of Hong Kong, Kowloon (HK)

(72) Inventors: Yang Lu, New Territories (HK); Jian Song, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/399,006

(22) Filed: Jan. 5, 2017

(65) Prior Publication Data

US 2018/0186957 A1 Jul. 5, 2018

(51) Int. Cl.
| | |
|---|---|
| *B32B 3/22* | (2006.01) |
| *C08J 9/00* | (2006.01) |
| *B32B 5/02* | (2006.01) |
| *B32B 5/12* | (2006.01) |
| *B32B 3/26* | (2006.01) |
| *B32B 3/18* | (2006.01) |

(Continued)

(52) U.S. Cl.
CPC .................. *B32B 3/22* (2013.01); *B32B 3/18* (2013.01); *B32B 3/26* (2013.01); *B32B 5/028* (2013.01); *B32B 5/12* (2013.01); *B32B 5/18* (2013.01); *B32B 5/20* (2013.01); *C08J 9/0085* (2013.01); *C08J 9/26* (2013.01); *C08J 2201/03* (2013.01); *C08J 2201/0444* (2013.01); *C08J 2201/0446* (2013.01); *C08J 2207/00* (2013.01); *C08J 2300/30* (2013.01); *C08J 2367/02* (2013.01); *C08J 2367/04* (2013.01)

(58) Field of Classification Search
CPC ........... B32B 5/18; B32B 5/20; B32B 27/065; B32B 2305/02; B32B 2305/022; B32B 2305/026; B32B 3/18; B32B 3/20; B32B 3/22; Y10T 428/249921–249993
See application file for complete search history.

(56) References Cited

U.S. PATENT DOCUMENTS

| | | | | |
|---|---|---|---|---|
| 4,091,153 A | | 5/1978 | Holman | |
| 4,125,664 A | * | 11/1978 | Giesemann | ......... B29C 44/5618 428/48 |

(Continued)

FOREIGN PATENT DOCUMENTS

| | | | | |
|---|---|---|---|---|
| JP | 2000160034 A | * | 6/2000 | |
| WO | WO-2008052784 A1 | * | 5/2008 | ............... B27N 3/04 |

(Continued)

OTHER PUBLICATIONS

Derwent abstract of JP 2000/160034 A.*

(Continued)

*Primary Examiner* — Z. Jim Yang
(74) *Attorney, Agent, or Firm* — Renner Kenner Greive Bobak Taylor & Weber

(57) ABSTRACT

A material composition including a matrix including a first material, the matrix including a plurality of voids disposed in the matrix, two or more voids being spaced apart from each other, a plurality of elongate fibers of a second material located within the matrix, wherein the plurality of fibers are configured to reinforce the matrix and, wherein the material composition is a composite material composition.

19 Claims, 7 Drawing Sheets

(51) Int. Cl.
  *B32B 5/20* (2006.01)
  *B32B 5/18* (2006.01)
  *C08J 9/26* (2006.01)

(56) References Cited

U.S. PATENT DOCUMENTS

| | | | |
|---|---|---|---|
| 4,680,214 A | 7/1987 | Frisch et al. | |
| 4,753,841 A * | 6/1988 | Noel | B29C 66/1142 428/174 |
| 4,810,551 A | 3/1989 | Chu | |
| 5,508,085 A * | 4/1996 | Lockshaw | B32B 3/12 428/178 |
| 5,741,589 A * | 4/1998 | Fujii | B28B 1/525 428/106 |
| 5,916,105 A | 6/1999 | Gow | |
| 6,037,033 A * | 3/2000 | Hunter | B32B 3/28 428/72 |
| 6,197,414 B1 * | 3/2001 | Kawai | B27N 3/04 428/292.4 |
| 6,268,047 B1 * | 7/2001 | Mulder | B29C 70/081 428/298.1 |
| 6,383,608 B1 * | 5/2002 | Burkett | B29C 44/1266 264/45.1 |
| 7,337,544 B2 | 3/2008 | Fagan et al. | |
| 7,939,156 B1 * | 5/2011 | Slaven, Jr. | B27N 1/00 428/105 |
| 2002/0139082 A1 * | 10/2002 | Deford | C04B 28/02 52/783.1 |
| 2003/0082338 A1 * | 5/2003 | Baker | C04B 26/045 428/114 |
| 2003/0208982 A1 * | 11/2003 | Korman | E04B 1/3555 52/596 |
| 2004/0094875 A1 | 5/2004 | Estrada et al. | |
| 2004/0108042 A1 * | 6/2004 | Affentranger | B27N 5/00 156/153 |
| 2005/0013982 A1 * | 1/2005 | Burgueno | E04C 2/16 428/292.1 |
| 2005/0223671 A1 * | 10/2005 | Korman | E04B 2/02 52/607 |
| 2005/0255289 A1 * | 11/2005 | Wadley | B64D 7/00 428/116 |
| 2007/0077445 A1 * | 4/2007 | Lawson | A01N 59/14 428/537.1 |
| 2009/0087656 A1 * | 4/2009 | Plaehn | B29C 44/12 428/378 |
| 2009/0239059 A1 * | 9/2009 | Kipp | C04B 28/26 428/323 |
| 2009/0263617 A1 * | 10/2009 | Ou | B32B 21/12 428/106 |
| 2009/0324876 A1 * | 12/2009 | Yang | B32B 21/14 428/99 |
| 2010/0028617 A1 | 2/2010 | Plaehn | |
| 2010/0136269 A1 * | 6/2010 | Andersen | B28B 3/26 428/34.4 |
| 2011/0293880 A1 * | 12/2011 | Yu | B27N 3/04 428/106 |
| 2013/0220195 A1 * | 8/2013 | Sjostedt | B32B 5/26 114/102.3 |
| 2013/0316126 A1 * | 11/2013 | Moeller | B27D 1/06 428/106 |
| 2014/0065341 A1 * | 3/2014 | Sutton | E04C 2/20 428/54 |
| 2015/0284911 A1 * | 10/2015 | Juvonen | B32B 29/005 442/158 |
| 2015/0290968 A1 * | 10/2015 | Hannig | E04F 15/102 428/192 |
| 2015/0300019 A1 * | 10/2015 | Li | B32B 5/245 428/188 |
| 2016/0063984 A1 * | 3/2016 | Kosonen | C08K 7/02 252/62 |
| 2016/0325520 A1 * | 11/2016 | Berger | B32B 9/04 |
| 2017/0114541 A1 * | 4/2017 | Hebel | E04C 5/168 |
| 2018/0281340 A1 * | 10/2018 | Brienza | B32B 3/266 |

FOREIGN PATENT DOCUMENTS

| | | | | |
|---|---|---|---|---|
| WO | WO-2012085420 A1 * | 6/2012 | | E04C 3/29 |
| WO | WO 2017/025786 A1 * | 2/2017 | | |

OTHER PUBLICATIONS

Definition of the term "Matrix" from the Oxford English Dictionary (Year: NA) (Year: NA).*
Habibi, M., et al., "Asymmetric flexural behavior from bamboo's functionally graded hierarchical structure: Underlying mechanisms", Acta Biomaterialia, vol. 16, pp. 178-186, 2015.
Habibi, M., et al., "Crack Propagation in Bamboo's Hierarchical Cellular Structure", Scientific Reports, pp. 1-7, 2014.
Habibi, M., et al., "Viscoelastic damping behavior of structural bamboo material and its microstructural origins", Mechanics of Materials, vol. 97, pp. 184-198, 2016.
Zou, M., et al., "A bionic method for the crashworthiness design of thin-walled structures inspired by bamboo", Thin-Walled Structures, No. 101, pp. 220-230, 2016.
Guan, R., et al., "Microcellular thin PET sheet foam preparation by compression molding", Journal of Applied Polymer Science, vol. 93, pp. 1698-1704, 2004.
Burgueno, R., et al., "Load-bearing natural fiber composite cellular beams and panels", Composites Part A: Applied Science and Manufacturing, vol. 35, pp. 645-656, 2004.
Xu, J., et al., "Microcellular Foam Processing in Reciprocating-Screw Injection Molding Machines", Journal of Injection Molding Technology, vol. 5, No. 3, pp. 152-159, 2001.
Burgueno, R., et al., "Hierarchical cellular designs for load-bearing biocomposite beams and plates", Materials Science & Engineering A, vol. 390, pp. 178-187, 2005.

* cited by examiner

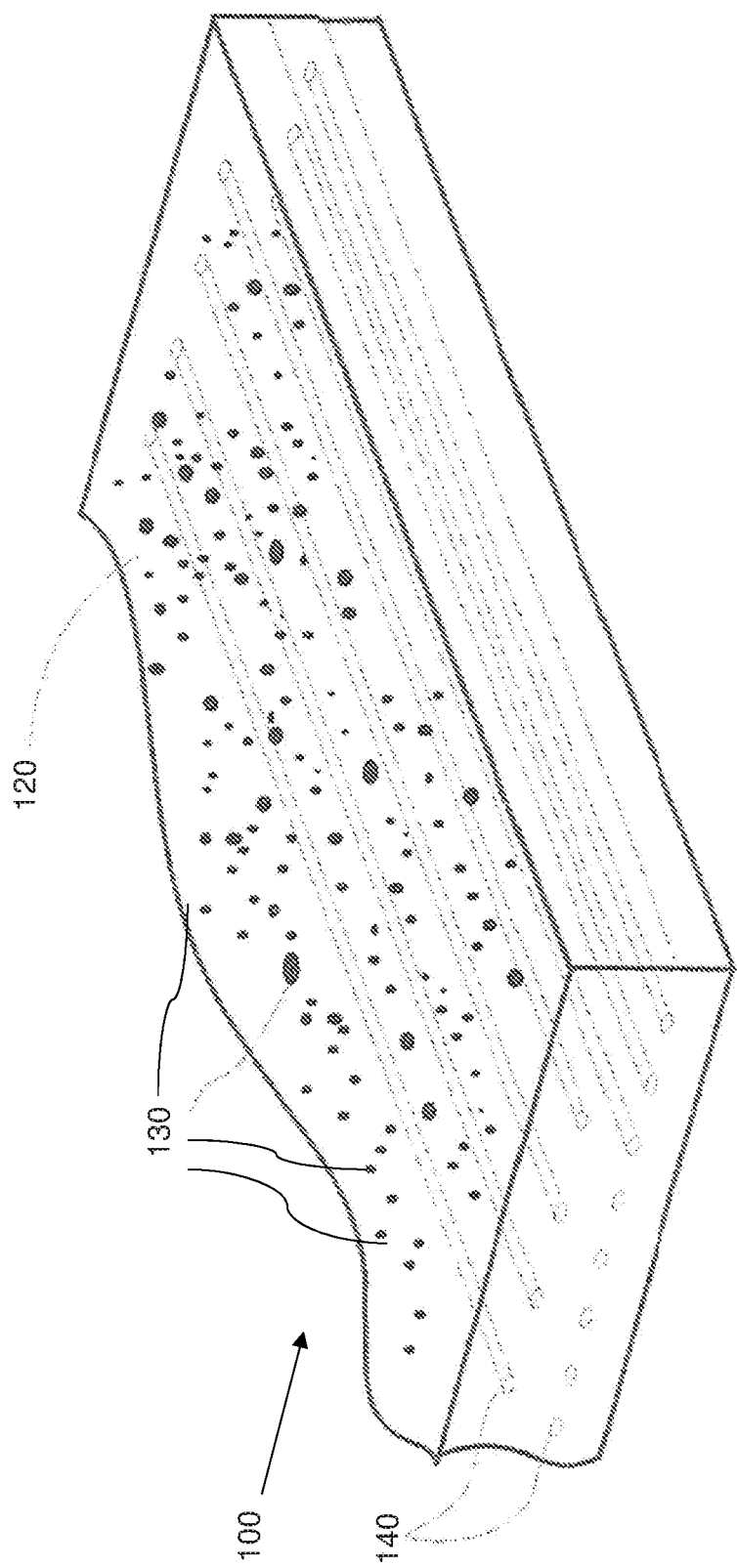

COMPOSITE MATERIAL COMPOSITION AND A METHOD OF FORMING A COMPOSITE MATERIAL COMPOSITION

TECHNICAL FIELD

The present disclosure relates to a composite material composition and a method of forming a composite material composition, and in particular the present disclosure relates to a composite material panel and a method of forming a composite material panel.

BACKGROUND

In engineering there is a common need for materials that have good mechanical properties and low weight or low density. Sustainability is becoming an important issue and an important consideration for structural materials design. One way of achieving more sustainable material design or material choices is to use recyclable or biodegradable materials. There has been an increasing awareness and an increased need for the use of natural and more sustainable materials for use in manufacturing various products to achieve more environmentally friendly and sustainable products. Construction panels, home furniture, decorating systems, commodity products are examples some products where natural materials are often used.

However the use of natural products poses its own set of challenges. Often natural materials have poor mechanical properties such as stiffness, density, elasticity and so on. Further using natural products, such as wood products, is challenging due to restrictions on harvesting of natural forests and the increased cost of using wood or other plant based materials.

Reference to any prior art in the present disclosure is not, and should not be taken as, an acknowledgement or any form of suggestion that prior art forms part of the common general knowledge in the field of endeavor in any country in the world.

SUMMARY OF THE INVENTION

The present disclosure describes one or more embodiments of composite material composition and a method of forming a composite material composition that will overcome or substantially ameliorate at least some of the deficiencies of the prior art, or at least provide the public with a useful alternative.

The present disclosure relates to a composite material composition and a method of forming the composite material composition. In particular, the present disclosure relates to a composite material panel and a method of forming the composite material panel. The composite material composition or composite material panel, as described herein, may be used or further processed or further modified for use in making furniture, construction panels, shelves and shelving systems, shoe racks, food trays and other commodity products. The method of forming the composite material composition or the composite material panel may be modified to include any additional steps to create a suitable useful product that comprises either the composite material composition or composite material panel.

In accordance with a first aspect, the present disclosure relates to a material composition comprising a matrix including a first material, the matrix including a plurality of voids disposed in the matrix, two or more voids being spaced apart from each other, a plurality of elongate fibers of a second material located within the matrix, wherein the plurality of fibers are configured to reinforce the matrix and, wherein the material composition is a composite material composition.

In an embodiment the first material and second material are biodegradable or recyclable.

In an embodiment the second material is more rigid or stiffer than the first material.

In an embodiment the voids in the matrix are regularly spaced within the matrix, such that each void is equally spaced from at least two or more adjacent voids.

In an embodiment each fiber of the plurality of fibers are arranged parallel to each other and at least two or more of the fibers being equally spaced from each other.

In an embodiment the plurality of fibers are arranged in a longitudinal direction of the matrix such that the longitudinal axis of each fiber of the plurality of fibers is parallel to the longitudinal axis of the matrix.

In an embodiment the material composition comprises two or more layers of fibers, wherein each layer of fibers includes a plurality of fibers.

In an embodiment the intra-layer fibers are arranged parallel to each other and the inter-layer fibers are arranged parallel to each other.

In an embodiment a first layer of the two or more layers of fibers includes more fibers than a second layer of the two or more layers of the fibers.

In an embodiment the composite material composition comprises a plurality of fiber bundles and wherein each fiber bundle comprises at least two fibers being attached to each other and wherein the fiber bundles are spaced apart from each other and are arranged parallel to each other.

In an embodiment the voids in the matrix are arranged in a regular pattern, the voids defining a mesh structure within the matrix.

In an embodiment first material is a polymer material, the second material is a man-made or a natural material.

In an embodiment the first material is one of Polybutylene Succinate (PBS) or Polylactic Acid (PLA), and, the second material is any one or a combination of glass, carbon, bamboo, sisal, cotton or coconut.

In an embodiment the present disclosure relates to a composite material panel that comprises a material composition as described in any one of the statements earlier, and wherein the composite material panel is configured to mechanically behave like bamboo.

In accordance with a second aspect, the present disclosure relates to a composite material panel comprising;
a polygon shaped body, the body including,
a matrix including a first material,
the matrix including a plurality of voids disposed in the matrix, two or more voids being spaced apart from each other,
a plurality of elongate fibers of a second material located within the matrix, wherein the plurality of fibers are configured to reinforce the matrix.

In an embodiment the first material and second material are biodegradable or recyclable, and wherein the second material is more rigid or stiffer than the first material, the first material is a biodegradable polymer and the second material is a manmade or natural material.

In an embodiment the voids in the matrix are regularly spaced within the matrix, such that each void is equally spaced from at least two or more adjacent voids, the voids being arranged in a regular pattern in the matrix, the voids defining a mesh structure within the matrix.

In an embodiment each fiber of the plurality of fibers are arranged parallel to each other and at least two or more of the fibers being equally spaced from each other and the plurality of fibers are arranged in a longitudinal direction of the body such that the longitudinal axis of each fiber of the plurality of fibers is parallel to the longitudinal axis of the body.

In an embodiment the body of the composite material panel comprises two or more layers of fibers, wherein each layer of fibers includes a plurality of fibers, wherein the intra-layer fibers are arranged parallel to each other and the inter-layer fibers are arranged parallel to each other, and a first layer of the two or more layers of fibers includes more fibers than a second layer of the two or more layers of the fibers.

In accordance with a third aspect, the present disclosure relates a method of forming a composite material composition, the method comprising the steps of:

forming a matrix of a first material, the matrix includes a plurality of voids within the matrix, adding a plurality of elongate fibers into the matrix such that each fiber is encased within the matrix, wherein each fiber of the elongate fibers are made of a second material and wherein the fibers are configured to reinforce the matrix.

In an embodiment the step of forming the matrix comprises the additional steps of: adding a void creating agent to a first material, extruding a matrix comprising the first material and the void creating agent, wherein the void creating agent creates the plurality of voids within the matrix.

In an embodiment the method of forming a composite material composition comprises the additional step of compression moulding the matrix and the plurality of elongate fibers to embed the plurality of fibers into the matrix.

In an embodiment the method of forming a composite material composition comprises the additional step of immersing the matrix including the void creating agent and the fibers into a cooling bath for a plurality of days to create a plurality of structures within the matrix, the number or size or the number and size of the structures being controlled by the amount of time the matrix is immersed in the cooling bath, and wherein the structures relate to the voids.

In an embodiment the method of forming the composite material composition comprises the step of removing the void creating agent from the matrix by using an ultrasonic clearing process, and wherein the clearing process also removes the structures within the matrix to define the voids within the matrix.

In an embodiment the method of forming the composite material composition comprises the additional step of grinding grains of the first material and the void creating agent.

In an embodiment the first material is a polymer material, the void creating agent is a nucleating agent or a foaming agent, and the fibers are either man-made fibers or natural fibers.

The term "comprising" (and its grammatical variations) as used herein are used in the inclusive or open sense of "having" or "including" and not in the closed sense of "consisting only of".

BRIEF DESCRIPTION OF THE DRAWINGS

Embodiments of composite material composition and method of forming the composite material composition will be described, by way of example, with reference to the accompanying drawings in which:

FIG. 1a shows a perspective view of a composite material panel that includes a composite material composition.

FIG. 1b shows an end section view of the composite material panel of FIG. 1a.

DETAILED DESCRIPTION OF A PREFERRED EMBODIMENT

The present disclosure is directed to a composite material composition that comprises a matrix formed of a first material and a plurality of fibers arranged to be embedded within and extending within the matrix. The matrix includes a plurality of voids within it. The voids within the matrix are dispersed throughout the matrix. The fibers are formed from a second material and the fibers are configured to reinforce the matrix. The first and second material are different materials and the second material is stiffer than the first material. The composite material composition is made from recyclable materials such that the composite material composition and any products using the composite material composition are environmentally friendly and sustainable. Some exemplary embodiments of a composite material will now be described with reference to the figures.

Figure 1B:
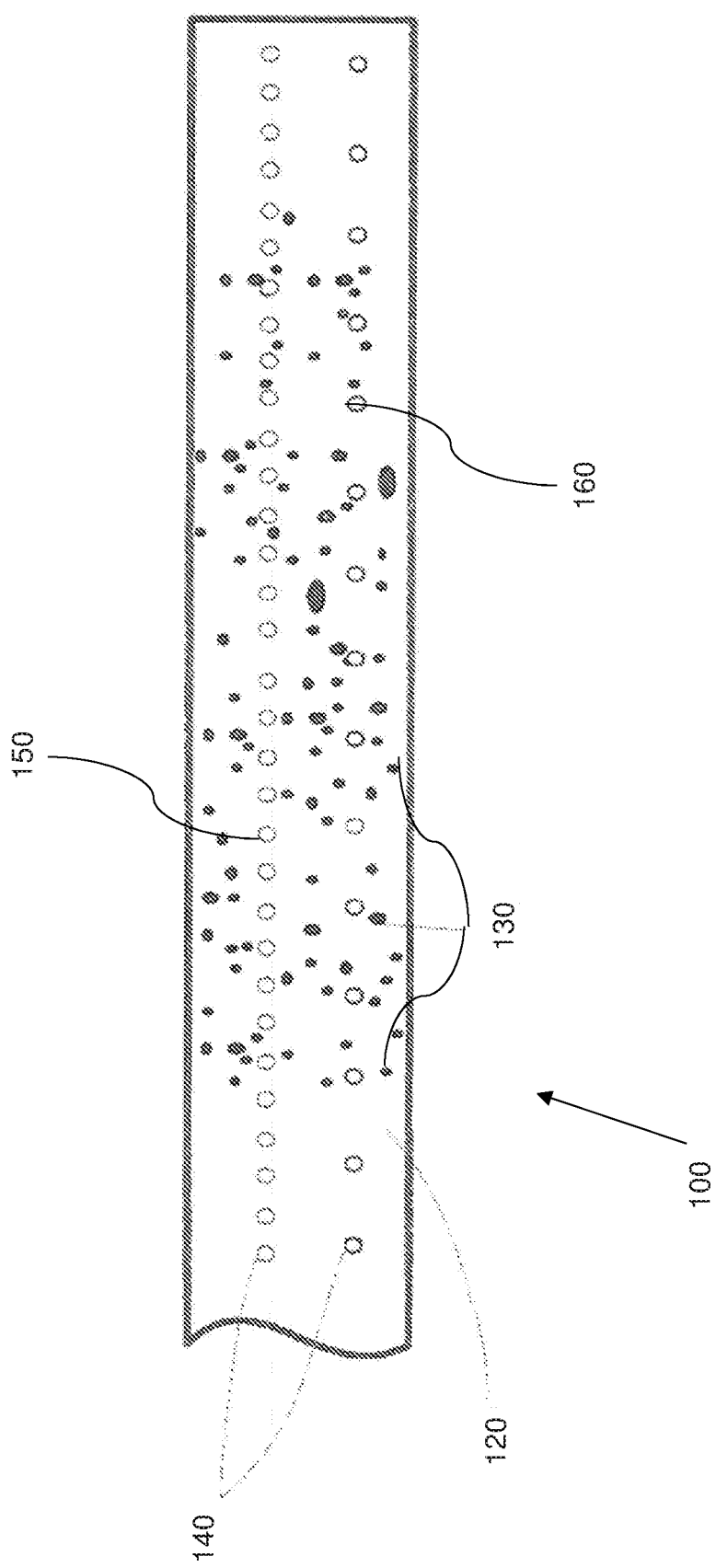

FIG. 1a shows a perspective view of a composite material composition. FIG. 1a shows a composite material panel that includes a body 10. The body comprises a composite material composition 100. FIG. 1b shows an end section view of the composite material panel of FIG. 1a. The composite material composition as shown in FIG. 1a and FIG. 1b are exemplary embodiments of a composite material composition. The composite material composition 100 can be formed into a polygon panel, as shown in FIGS. 1a, 1b, but also can be formed into any other suitable shape or object.

The composite material composition 100 is shown in form of a panel 110. As shown in FIG. 1a the composite material composition 100 comprises a matrix 120. The matrix 120 includes a first material. The matrix 120 comprises a plurality of voids 130 within the matrix. The voids 130 are dispersed within the matrix 130. The composite material composition 100 further comprises a plurality of fibers 140. The fibers 140 are positioned within or upon the matrix 120. As shown in FIG. 1a the fibers 140 are embedded within the matrix 120. The fibers 140 are configured to reinforce the matrix and provide improved mechanical properties. The fibers 140 are formed from a second material that is different to the first material. The second material of the fibers 140 is stiffer than the first material of the matrix 120. The number of voids may be increased by controlling the manufacturing process. The voids reduce density and weight of the composition. The voids 130 may be between tens of microns to hundreds of microns in size. The voids 130 are substantially uniform in size. In one example 45% of the volume of the composition comprises the voids 130, while 55% of the volume comprises the matrix 120 and fibers 140.

Referring again to FIGS. 1a and 1b the matrix is made of a first material that is a biodegradable or a recyclable material. The first material is preferably a non-toxic, biodegradable or recyclable polymer and the matrix 120 is formed from this biodegradable or recyclable polymer. The first material may be formed from a thermoplastic polymer or a polyester material. The first material is one of Polylactic acid (PLA) or Polybutylene succinate (PBS). Alternatively the first material may be a combination of biodegradable polymers. For example the matrix 120 is formed from PLA or (PBS). Alternatively the matrix may be formed from a combination of PLA and (PBS) or a combination of any other suitable non-toxic, biodegradable polymers.

The matrix 120 acts as a body of medium to support the fibers and includes voids within it. The matrix 120 is a base of the composite material composition. The matrix can be shaped to any suitable shape by any suitable shaping or forming process.

The matrix 120 further includes a plurality of voids 130. As shown in FIGS. 1a and 1b the voids are dispersed throughout the matrix 120. The voids 130 may be regularly spaced within the matrix 120, such that each void is equally spaced from at least two adjacent voids. Alternatively the voids 130 may be randomly dispersed throughout the matrix 120. In the illustrated embodiment of FIGS. 1a and 1b the voids 130 are randomly dispersed throughout the matrix 120. In the illustrated embodiment of FIGS. 1a and 1b, the voids are of different sizes. The voids 130 may have random sizes. As shown in figures the matrix 120 includes some large voids and some small voids. The voids may be generally circular or spherical or elliptical in shape. Alternatively the voids may have random shapes and may be varied in shape. In one example the voids are between 50 micrometers and 400 micrometers in diameter. In another example the voids may have a major axis and a minor axis, and wherein the major axis is between 50 micrometers and 400 micrometers in length. The major axis is the longer dimension than the minor axis. The length of the elongate fibers can be any suitable or desired length. The overall dimensions of the elongate fibers can be any suitable or required dimensions depending of the size of the product that incorporates or utilizes the composite material composition as described.

The voids 130 in the matrix 120 define a mesh structure within the matrix 120. The mesh structure includes a plurality of interstices or voids 130. The mesh structure of the matrix 120 is similar to a foam or foamed structure with a plurality of voids within a medium. The mesh structure of the matrix 120 is advantageous because it reduces the overall weight of the composite material composition and any product that includes the composite material composition such as a composite material panel.

The elongate fibers 140 are embedded within the matrix 120, as shown in FIGS. 1a and 1b. The fibers 140 are configured to reinforce the mesh matrix 120. The fibers 140 may have any suitable shaped cross section. In the illustrated embodiment of FIGS. 1a and 1b, the fibers 140 are circular in cross section and are cylindrical in shape. Alternatively the fibers may have a elliptical or rectangular or triangular or square cross section, or any other polygon shaped cross section.

The fibers 140 extend the length of the body 10. Alternatively the fibers may only extend along a partial length of the body 10. The fibers 140 are unidirectional in the matrix 120. As shown in FIGS. 1a and 1b the fibers 140 are arranged in a longitudinal direction of the matrix 120 such that the longitudinal axis of each fiber 140 is parallel to the longitudinal axis of the matrix 120. In the exemplary embodiment of the composite material panel shown in FIG. 1a the fibers are arranged in a longitudinal direction such that the longitudinal axis of each fiber is parallel to the longitudinal axis of the body 10. The fibers 140 are arranged parallel to each other. Alternatively some fibers 140 may be arranged parallel to other fibers and some fibers may be arranged perpendicular to each other.

The fibers 140 are made from a second material. The second material is stiffer or more rigid than the first material. The second material of the fibers 140 has a higher density than the first material. Further the fibers 140 are denser than the matrix 120, since the matrix includes a plurality of voids while the fibers are solid or monolithic fibers. The second material is preferably also a non-toxic, biodegradable material. The second material may be a man-made or natural material. The second material may be one of a carbon, graphite, glass or a polymer. The fibers 140 may be carbon fibers, graphite fibers, glass fibers or polymer fibers, wherein the polymer is a biodegradable or recyclable polymer. Alternatively the second material may be bamboo, sisal, cotton or coconut. Preferably a man-made material such as glass or carbon is used to make the fibers to improve sustainability of the composite material composition and also make the composite material composition more environmentally friendly since plants or trees do not have to be harvested to form the fibers 140. The material for the fibers can be dependent on the required application. Preferably a recyclable or biodegradable polymer or material is used. The fibers can have any suitable dimensions as required. For example the length of the fibers can be between 60 mm and 80 mm with a diameter between 80 micrometers to 300 micrometers. Other dimensioned fibers can be utilized.

The composite material composition may comprise two or more layers of fibers, wherein each layer of fibers includes a plurality of fibers. FIGS. 1a and 1b show a composite material panel that includes the composite material composition 100. As shown in FIG. 1b the panel body 10 comprises two layers of fibers, a first layer 150 and a second layer 160. As shown in FIG. 1b the intra-layer fibers 140 are arranged parallel to each other and the inter layer fibers 140 are arranged parallel to each other. To describe this another way the fibers in the first layer are parallel to each other (i.e. intra layer fibers) and the fibers in the first layer are arranged parallel to the fibers in the second layer (i.e. inter layer fibers). In other embodiments that include more than two layers, the intra layer fibers and inter layer fibers can be arranged parallel to each other. Preferably the inter layer fibers are arranged parallel to each other. In alternative embodiments (not illustrated), the inter layer fibers are arranged perpendicular to each other.

In an embodiment one layer of the two or more layers of fibers includes more fibers than one or more other layers. As shown in FIG. 1b the first layer 150 includes more fibers in it than the second layer 160. In the embodiment of FIG. 1 the first layer 150 includes twice as many fibers as the second layer 160. The first layer 150 comprises 32 fibers and the second layer 160 comprises 16 fibers. In an alternative embodiment the first layer may include 1.5 times to 4 times the number of fibers as compared to a second layer. In an alternative embodiments a first layer may include less fibers in it as compared to a second layer. In a further alternative embodiment each layer within a composite material composition includes an equal number of fibers. The fibers can be averagely distributed in each layer. In an alternative embodiment the composition the first fiber layer has a weight of 0.1 g while the second fiber layer has a weight that is between quarter and three quarters the weight of the first layer. In a further embodiment the composition comprises three layers of fibers, wherein the first layer has a weight of 0.1 g, the second layer has a weight of 0.075 g and the third layer has a weight of 0.05 g.

The number of layers of fibers is dependent on the overall dimensions of the composition, and in particular dependent on the thickness of the composition 100. For example the thicker the composition the more layers of fibers that can be accommodated or introduced into the composition. The number of layers can also be varied depending on the mechanical performance required by the composition or any construction using the composition. For example for a stiffer composition a greater number of fiber layers can be used.

The composite material composition 100 may comprise a plurality of fiber bundles. Each fiber bundle comprises at least two fibers that are attached to each other or positioned adjacent each other. The fiber bundles may include a plurality of fibers that are bunched together. The fibers may be connected to each other or may be tightly packed together adjacent each other to form a bundle of fibers. The fiber bundles may be spaced apart from each other. In one example each fiber bundle comprises between 1000 to 4000 fibers. In a further example each fiber bundle comprises 3000 fibers.

Figure 2:
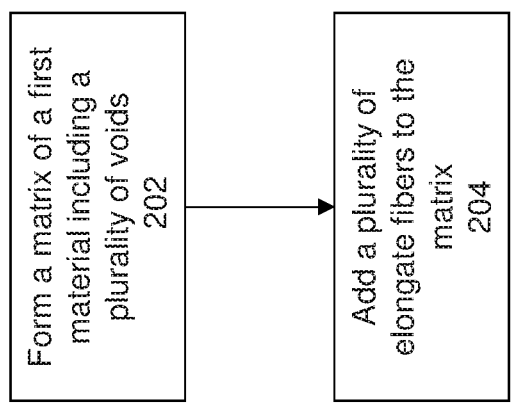
FIG. 2 shows a flow chart for a method of forming a composite material composition.

FIG. 2 illustrates a flow chart of a method of forming a composite material composition 200. The method 200 as described can be used to create a composite material panel that comprises a body, wherein the body includes a composite material composition. The method 200 begins at step 202. Step 202 comprises forming a matrix of a first material wherein the matrix includes a plurality of voids within the matrix. The matrix being created by extruding the first material through an extruder. The method proceeds to step 204 that comprises adding a plurality of elongate fibers into the matrix such that each fiber is encased in the matrix. The elongate fibers being made of a second material that is different to the first material of the matrix. The fibers being arranged such that the fibers reinforce the matrix. The fibers are added into the matrix by a compression moulding process. The method 200 may comprise the optional step of forming the composite material composition into a product such as a composite material panel or a composite material tray or a composite material furniture. The step of forming the composite material composition into a product can utilize any suitable process such as moulding or machining or cutting etc. The voids in the matrix can be formed by an additional step of adding a foaming agent or using a nucleating agent and controlling the foaming time or nucleating time to create the desired size and distribution of voids within the matrix.

Figure 3:
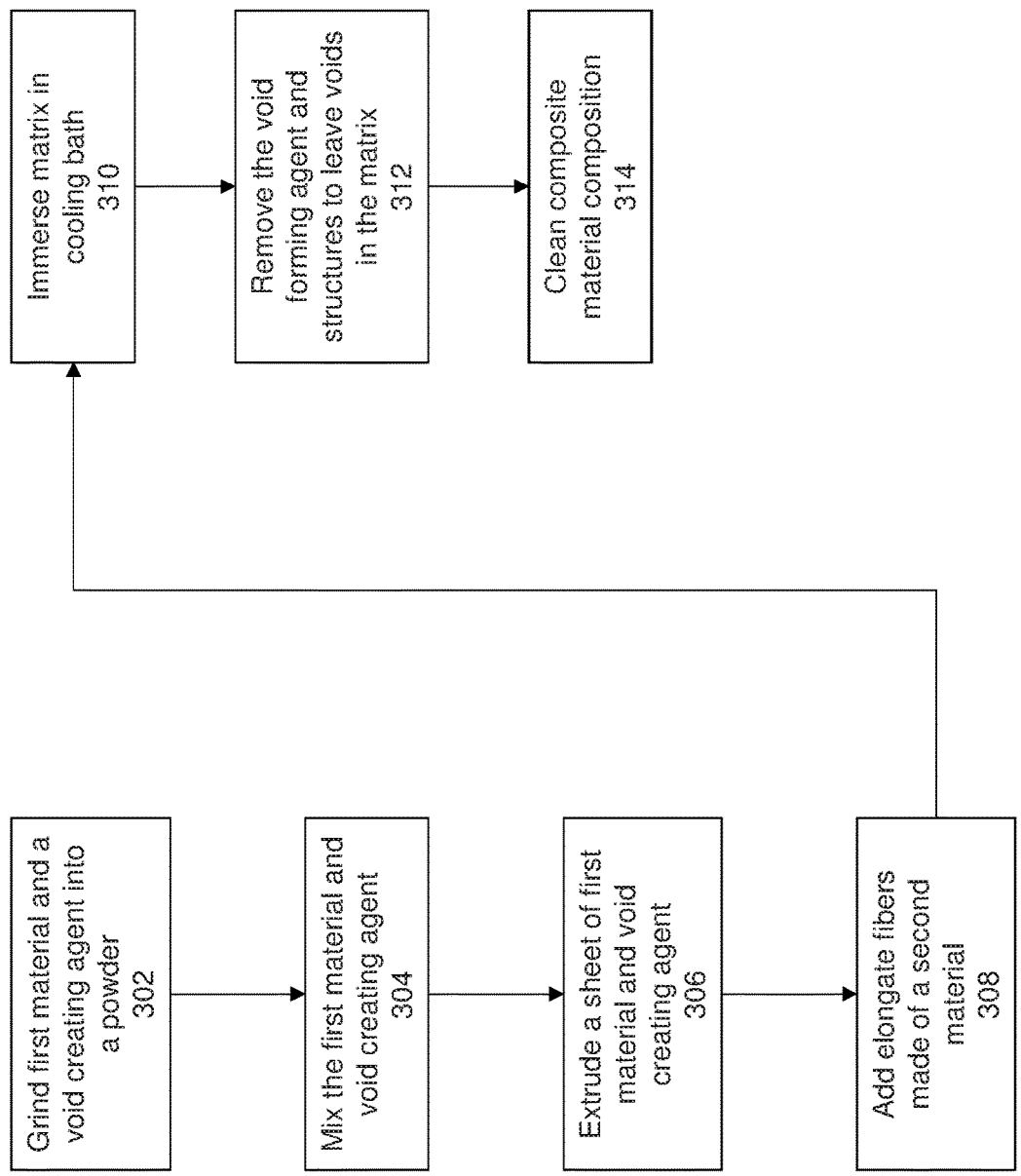
FIG. 3 shows a flow chart of another method of forming a composite material composition.

FIG. 3 shows a flow chart of a further method of forming a composite material composition 300. The method 300 comprises a plurality of steps. The method 300 begins at step 302. Step 302 comprises grinding a first material and a void creating agent into a powder. The first material that is the main constituent of the matrix of the composite material composition. The first material and the void creating agent are ground using a milling machine such as a planetary ball mill machine. Step 304 comprises mixing the powder of the first material and the powder of the void creating agent together using a suitable mixer. The first material is a non-toxic, biodegradable or recyclable polymer material. The first material is PSB or PLA as described earlier. The void creating agent may be a nucleating agent or a foaming agent. For example the void creating agent may be a salt such as NaCl of $NaHCO_3$ or any other such salt. The volume ratio of PBS to nucleating agent, such as NaCl, is between 1:1.1 to 1:2. Preferably the volume ratio of PBS to NaCl, in the presently described exemplary embodiment is 1:1.6. Similar weight ratios of PBS to NaCl can be used.

Alternatively the void creating agent may be any suitable foaming agent, such as a chemical foaming agent. The chemical foaming agents can produce gas which can foam the voids at a specific condition. The foaming agent can be dissolved to create the voids.

The method proceeds to step 306. At step 306 sheet or structure of first material and void creating agent is created by extrusion. The extrusion temperature 200 degrees Celcius and the extrusion rate is 50 rpm. In one example the sheet or structure created at step 306 may be created using a double screw extruder. The sheet or structure is the matrix of the composite material composition.

At step 308 a plurality of elongate fibers are added to the matrix that comprises the first material and the void creating agent. The plurality of elongate fibers are made of a second material as described earlier. The fibers can be formed from any suitable process such rolling, turning, molding, casting, blowing or any other suitable process to create elongate fibers of a required diameter. The dimensions of the elongate fibers can be any suitable dimensions. Step 308 adding the fibers into the matrix by a moulding process such as for example a compression moulding process. The moulding compression pressure is 100 Pa, but the moulding compression pressure can be changed to suit the materials used to manufacture the composition.

Step 310 comprises immersing the matrix, including the fibers, into a cooling bath for a specific time period to begin the nucleating process. The nucleating agent such as NaCl or $NaHCO_3$ will cause structures to form within the matrix. The number or size or the number and size of the structures being controlled by the amount of time the matrix is immersed in the cooling bath The structures may be crystals. The crystal formation within the matrix as part of the nucleating process. The crystals start as spherulites and grow as the matrix is cooled. The crystals grow as the matrix is cooled following the compression moulding process. The fibers are act as physical barriers for the crystals of the nucleating agent. In one example the density of the nucleating agent, such as NaCl is 2.16 $g/cm^3$ and the density of the matrix material, such as PBS is 1.26 $g/cm^3$.

The nucleating agent is used to increase the speed of crystallization within the first material. The cooling bath may be a water bath or any other cooling substance. The matrix is immersed in the cooling bath for several days to achieve the desired size and distribution of crystals. The crystals formed in the matrix may be crystals of the first material or may be crystals of the nucleating agent.

Step 312 comprises removing the void forming agent and the structures created in the matrix. The structures relate to the voids. The voids in the matrix correspond to the size, shape and distribution of the structures formed within the matrix. As stated earlier, the structures may be crystals of either the first material or the nucleating agent. Removing the structures leaves a plurality of voids in the matrix that define a mesh structure in the matrix. The cooling at step 310 is carefully controlled to achieve a desired distribution, size and number of structures in order to achieve a desired mesh structure. The nucleating agent and the structures (e.g. crystals) are removed by using an ultrasonic clearing process. An ultrasonic clearing machine can be used to remove Step 314 comprises the step of cleaning the composite material composition as created by method 300. The step of cleaning removes any additional residual surface particulate matter, dust, dirt or other unwanted particles on the surface of the composition. The method 300 may include an additional step of steps to create a product or other arrangement using the composite material composition such as for example a composite material panel, a composite material food tray or a composite material book shelf and so on.

Figure 4:
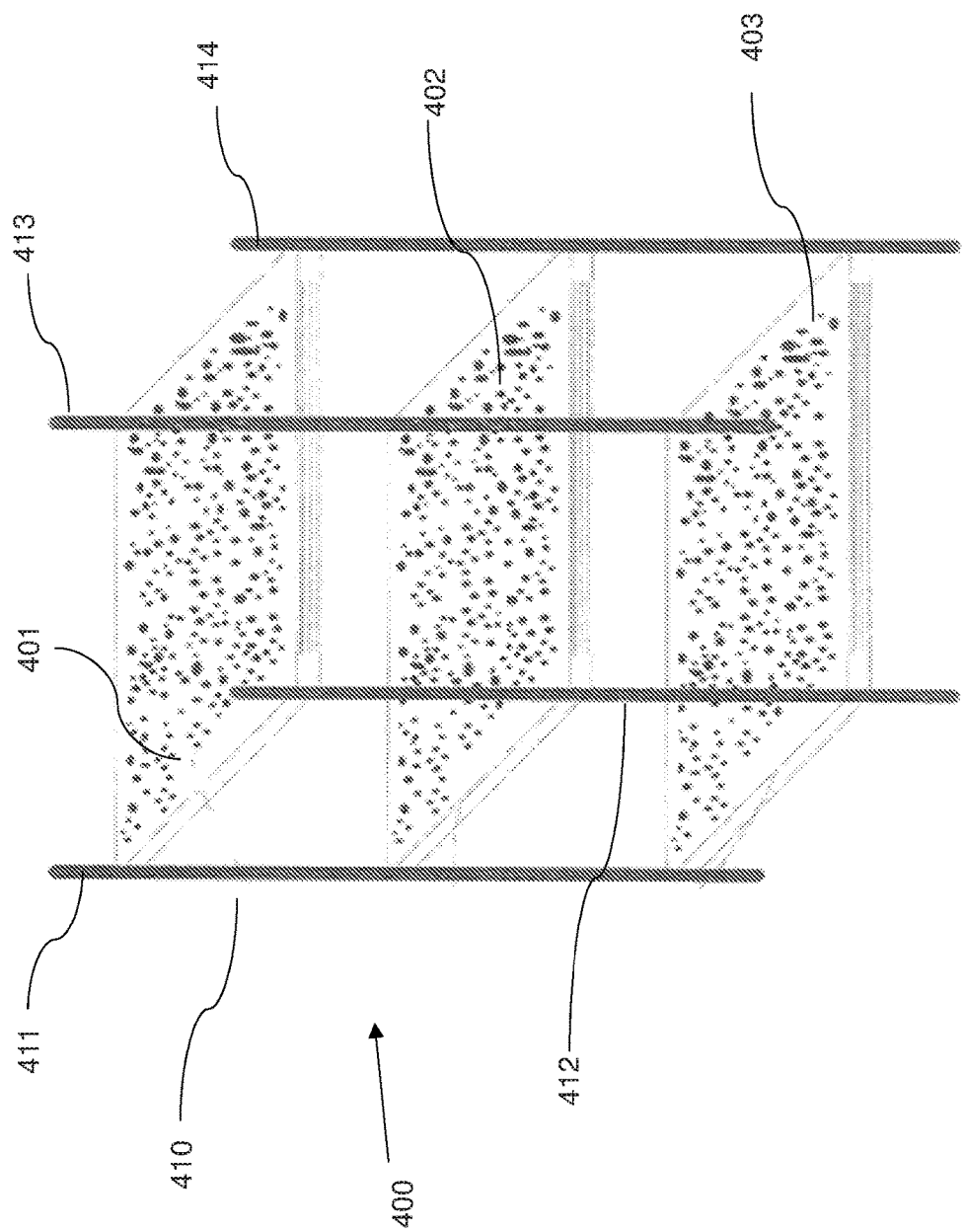
FIG. 4 shows a shoe rack that includes a plurality of composite material panels that include a composite material composition.
Figure 5:
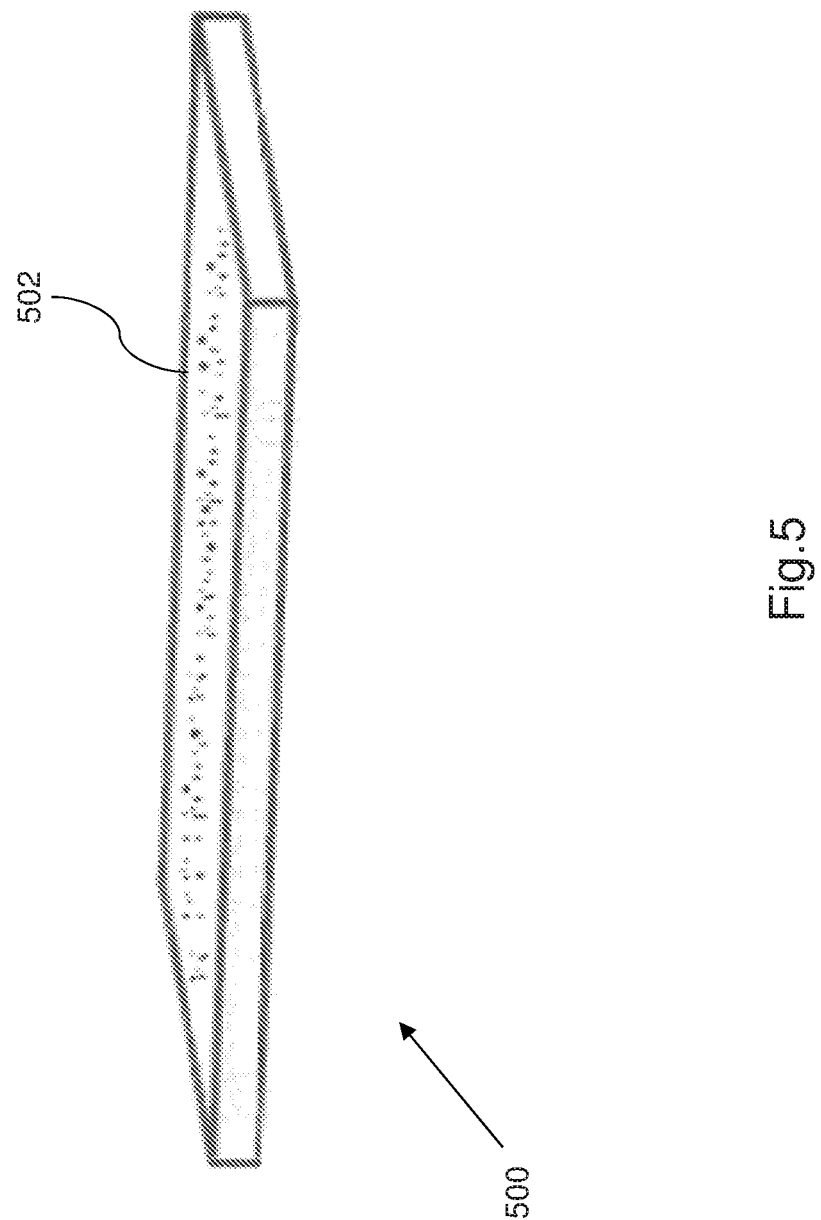
FIG. 5 shows a view of a composite material panel that is useable for construction or as office dividers.
Figure 6:
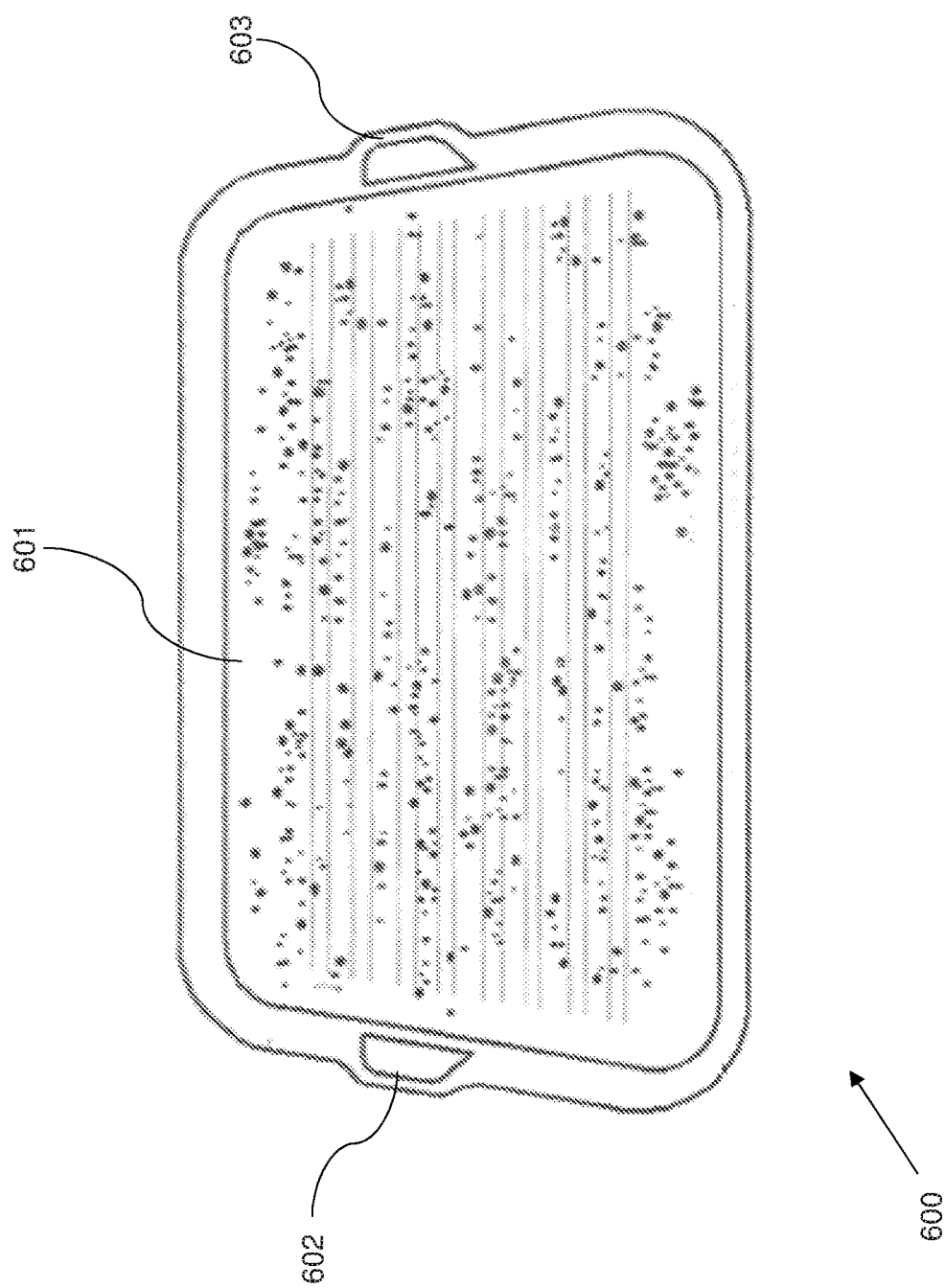
FIG. 6 shows a food tray formed of a composite material composition.

The composite material composition 100 as described above can be made into various products using any suitable manufacturing or forming processes. The composite material composition 100 can be used to create furniture, panels, construction panels, office dividers, shoe racks, book shelves, food trays or other commodity products. FIGS. 4 to 6 show example products that comprise the composite material composition 100. FIG. 4 shows a shoe rack 400 that includes a plurality of composite material panels that include a composite material composition 100. The shoe rack 400 comprises three shelves 401, 402 and 403. Each shelf 401, 402, 403 is a rectangular prism shaped shelf. Alternatively the shelf portion may be a cube shaped shelf or any other suitable shape. Each shelf 401, 402, 403 a composite material composition 100 as described earlier i.e. each shelf has a structure that is identical to the composite material composition as described herein. Each shelf comprises a matrix having a plurality of voids dispersed within the matrix and a plurality of elongate fibers embedded within the matrix. The matrix is formed of a first material and the fibers are formed from a second material that is stiffer than the first material. Each shelf 401-403 may comprise the composite material composition 100 as described in reference to FIGS. 1*a* and 1*b*. The shoe rack 400 further comprises a frame 410 that comprises four vertical struts 411, 412, 413, 414. The vertical struts include a plurality of flanges or horizontal members interconnecting the struts (not shown). The flanges or horizontal members are configured to support the shelves 401, 402 and 403. The struts 411-414 can be made of any suitable material such as metal or plastics material.

FIG. 5 shows a composite material panel 500. The composite material panel 500 may be used for any suitable purpose. For example the composite material panel 500 may be used in construction or as office dividers. The composite material 500 comprises a body 502. The body 502 is a polygon shaped body. In the illustrated embodiment the body is a rectangular prism but may alternatively be any other suitable three dimensional polygon. The body 502 includes a matrix including a first material. The matrix including a plurality of voids disposed in the matrix, two or more voids being spaced apart from each other. The body further comprises a plurality of elongate fibers of a second material located within the matrix, wherein the plurality of fibers configured reinforce the matrix. The first material and second material are biodegradable or recyclable, and wherein the second material is more rigid or stiffer than the first material. The polygon body 502 includes a composite material composition 100 as described with reference to FIGS. 1*a* and 1*b* and one or more of the features of the composite material composition 100. The composite material composition 100 can be formed into a rectangular prism shaped composite material panel 500 using any suitable process such as for example moulding or machining.

FIG. 6 shows a composite material food tray 600. The composite material food tray 600 is another example of a product that can include the composite material composition 100 as described. The composite material composition 100 can be formed into the composite material food tray 600 using any suitable manufacturing process such as moulding. The composite material food tray 600 includes a body 601 and a pair of handles 602, 603. Each handle is located at opposed ends of the body 601. The body 601 is formed of or comprises the composite material composition 100, as described earlier. The body 601 of the food tray 600 comprises a matrix of a first material including a plurality of voids interspersed throughout the matrix and a plurality of elongate fibers of a second material being embedded in the matrix to reinforce the matrix. The body 601 can include any one or more of the features of the composite material composition 100 as described with reference to FIGS. 1*a* and 1*b*.

The composite material composition 100 as described is advantageous because it is relatively light weight due to the voids in the matrix, and has relatively high bending and/or buckling resistance due to the reinforcing elongate fibers. The increased bending and/or buckling resistance is achieved by using fibers that are made from a material that is stiffer than the matrix material and since the fibers are arranged in a longitudinal direction. The composite material composition as described is fabricated or manufactured to simulate bamboo and simulate the mechanical properties of bamboo. For example the composite material composition 100 can have a tensile modulus of between 200 GPa/kg and 900 GPa/kg. The strength of the composite material may be between 350 and 550 MPa/kg.

The composite material composition 100 mimics the structure and mechanical properties of bamboo. The fibers 140 in the composition 100 are unidirectional and are similar to the vascular bundles of bamboo. The mesh structure of the matrix 120 mimics the cellular panechyma in bamboo. The structure of composition 100 provides any products that use the composition with low density while maintaining a high tensile strength, high compression strength, higher bending stiffness and a light weight.

Any product that utilizes the composite material composition 100 will also have mechanical properties that are similar to bamboo due to the structure of the composition 100. The composite material composition 100 is advantageous because it includes a hierarchical graded distribution of elongate fibers and a mesh structure. This improves the bending stiffness of the composition 100 and any product that utilizes the composite material composition 100. The weight of any product using the composite material composition 100 is reduced due to the mesh structure of the matrix. The composite material composition 100 further includes a high strength to weight ratio. The composite material composition 100 has a lower density as compared to some wood and metal products due to the mesh structure of the matrix.

The mesh structure with elongate reinforcing fibers of the composite material composition is advantageous because it improves the flexural stiffness, tensile strength and compression strength of the composition 100 and any products that use the composition 100.

The composite material composition 100 is advantageous because as it is a man-made product that is chemically manufactured. The composition 100 has a lower environmental impact as compared to products made of wood or other plant materials. Products that utilize the composite material composition 100 can be cheaper to manufacture than similar products that are formed of wood or other natural plants such as furniture or construction panels. The composite material composition 100 is also advantageous because all the constituents of the composition 100 are biodegradable or recyclable materials. Therefore any products that are made of the composite material composition 100 are more likely to be recycled or broken down naturally when discarded, thus reducing the environmental impact. Products that use the composite material composition 100 are advantageous because they can be marketed as "green"

or "environmentally friendly products". This is because the composition 100 is made from biodegradable or recyclable materials.

As stated earlier the composite material composition 100 mimics bamboo. However construction panels or other products that are used in construction made from bamboo can have inherent defects and raw bamboo can be difficult to form into products. The composite material composition 100 can be better controlled during the manufacturing process to reduce defects and the composition 100 is easier to form into other products.

The term composition as used herein to describe a composite material composition is used to mean a configuration or arrangement or structure that includes various features or constituents that form the composition. The composite material composition may also be termed as a composite material arrangement or composite material configuration or a composite material structure. The composite material composition defines the make-up of the composite material as described herein and the particular composition can be used to form or manufacture specific products as described herein. It will be appreciated by persons skilled in the art that numerous variations and/or modifications may be made to the present invention as shown in the specific embodiments without departing from the spirit or scope of the present disclosure. The present embodiments are, therefore, to be considered in all respects as illustrative and not restrictive.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, any other country.

The invention claimed is:

1. A composite material panel including a composite material composition with:
    a matrix formed of a first biodegradable polymer material, the matrix including a plurality of voids within the matrix, a major axis or diameter of the voids having a length between 50 micrometers and 400 micrometers; and
    a plurality of elongated fibers formed of a second biodegradable or recyclable material, the second biodegradable or recyclable material being different from the first biodegradable polymer material and wherein the second biodegradable material is more rigid or stiffer than the first biodegradable polymer material, the elongated fibers being located within the matrix and configured to reinforce the matrix, wherein the plurality of elongated fibers are arranged parallel to each other and are arranged in two or more parallel layers each with at least two elongated fibers, the two or more parallel layers include, at least, a first layer and a second layer, and the number of elongated fibers in the first layer is larger than the number of elongated fibers in the second layer; wherein the first biodegradable polymer material is polybutylene succinate or polylactic acid; and wherein the plurality of elongated fibers are carbon fibers, glass fibers, bamboo fibers, sisal fibers, cotton fibers, or coconut fibers.

2. The composite material panel in accordance with claim 1, wherein the voids are regularly spaced within the matrix, such that each void is equally spaced from at least two adjacent voids.

3. The composite material panel in accordance with claim 1, wherein at least one of the plurality of elongated fibers is equally spaced from two adjacent elongated fibers in the same layer.

4. The composite material panel in accordance with claim 1, wherein the plurality of elongated fibers are arranged in a longitudinal direction of the matrix such that longitudinal axes of the plurality of elongated fibers are parallel to a longitudinal axis of the matrix.

5. The composite material panel in accordance with claim 1, wherein the plurality of elongated fibers are arranged in a plurality of fiber bundles each having at least two elongated fibers attached to each other; and wherein the plurality of fiber bundles are spaced apart from each other and are arranged parallel to each other.

6. The composite material panel in accordance with claim 1, wherein the voids are arranged in a regular pattern.

7. The composite material panel in accordance with claim 1, comprising a polygon shaped body.

8. The composite material panel in accordance with claim 1, wherein the length of each elongated fiber is between 60 mm to 80 mm.

9. The composite material panel in accordance with claim 8, wherein the diameter of each elongated fiber is between 80 micrometres to 300 micrometres.

10. The composite material panel in accordance with claim 9, wherein the number of elongated fibers in the first layer is 1.5 times to 4 times the number of elongated fibers in the second layer.

11. The composite material panel in accordance with claim 1, wherein the first biodegradable polymer material is polybutylene succinate and wherein the plurality of elongated fibers are sisal fibers.

12. A composite material panel including a composite material composition with:
    a matrix formed of a first biodegradable polymer material, the matrix including a plurality of voids within the matrix, a major axis or diameter of the voids having a length between 50 micrometres and 400 micrometres, and wherein at least some of the voids are spherical or elliptical in shape; and and a plurality of elongated fibers formed of a second biodegradable or recyclable material, the second biodegradable or recyclable material being different from the first biodegradable polymer material and is more rigid or stiffer than the first biodegradable polymer material, the elongated fibers being located within the matrix and configured to reinforce the matrix; wherein the plurality of elongated fibers are arranged in a plurality fiber bundles each having at least two parallel elongated fibers attached to each other, and the plurality of fiber bundles are spaced apart from each other, arranged parallel to each other, and arranged in two or more parallel layers each with at least two elongated fibers bundles; wherein the first biodegradable polymer material is polybutylene succinate or polylactic acid, and wherein the plurality of elongated fibers are carbon fibers, glass fibers, bamboo fibers, sisal fibers, cotton fibers, or coconut fibers.

13. The composite material panel in accordance with claim 12, wherein a length of each fiber is between 60 mm to 80 mm.

14. The composite material panel in accordance with claim 13, wherein a diameter of each fiber is between 80 micrometres to 300 micrometres.

15. The composite material panel in accordance with claim 12, wherein the first material is Polybutylene Succinate and the plurality of elongated fibers are sisal fibers.

16. The composite material panel in accordance with claim 12, wherein the plurality of elongated fibers are arranged in a longitudinal direction of the matrix such that longitudinal axes of the plurality of elongated fibers are parallel to a longitudinal axis of the matrix.

17. A composite material panel including a composite material composition with:
a matrix formed of a first biodegradable polymer material, the matrix including a plurality of voids within the matrix, a major axis or diameter of the voids having a length between 50 micrometres and 400 micrometres; and
a plurality of elongated fibers formed of a second biodegradable or recyclable material, the second biodegradable or recyclable material being different from the first biodegradable polymer material and is more rigid or stiffer than the first biodegradable polymer material, the elongated fibers being located within the matrix and configured to reinforce the matrix; wherein the plurality of elongated fibers are arranged parallel to each other, and are arranged in two or more parallel layers each with at least two elongated fibers; wherein the first biodegradable polymer material is Polybutylene Succinate or Polylactic Acid, and wherein the plurality of elongated fibers are carbon fibers, glass fibers, bamboo fibers, sisal fibers, cotton fibers, or coconut fibers; wherein a length of each fiber is between 60 mm to 80 mm. and a diameter of each fiber is between 80 micrometres to 300 micrometres.

18. The composite material panel in accordance with claim 17, wherein the first material is Polybutylene Succinate and the plurality of elongated fibers are sisal fibers.

19. The composite material panel in accordance with claim 17, wherein the plurality of elongated fibers are arranged in a longitudinal direction of the matrix such that longitudinal axes of the plurality of elongated fibers are parallel to a longitudinal axis of the matrix.

* * * * *